US006498719B1

(12) United States Patent
Bridges

(10) Patent No.: US 6,498,719 B1
(45) Date of Patent: Dec. 24, 2002

(54) APPARATUS AND METHOD FOR REDUCING IMPACT-INDUCED SHOCK AND VIBRATION IN A PORTABLE COMPUTER

(75) Inventor: John W. Bridges, Pflugerville, TX (US)

(73) Assignee: Dell USA, L.P., Round Rock, TX (US)

(*) Notice: Subject to any disclaimer, the term of this patent is extended or adjusted under 35 U.S.C. 154(b) by 0 days.

(21) Appl. No.: 09/459,306

(22) Filed: Dec. 10, 1999

(51) Int. Cl.[7] .................................................. G06F 1/16
(52) U.S. Cl. ....................... 361/680; 361/683; 361/686; 361/724; 312/723.2; 248/632
(58) Field of Search ....................... 361/679, 683–686, 361/725, 829, 390, 391, 380, 427, 428, 429; 312/223.2; 360/97.02, 98.01; 369/75.1; 248/632, 638

(56) References Cited

U.S. PATENT DOCUMENTS

| 5,002,184 A | | 3/1991 | Lloyd | |
| 5,227,929 A | | 7/1993 | Comerford | |
| 5,269,598 A | * | 12/1993 | Liu | ........................ 312/223.2 |
| 5,587,855 A | | 12/1996 | Kim | |
| 5,706,168 A | | 1/1998 | Erler et al. | |
| 5,835,298 A | | 11/1998 | Edgerton et al. | |
| 6,078,498 A | * | 6/2000 | Eckerd et al. | ............... 361/685 |

* cited by examiner

Primary Examiner—Darren Schuberg
Assistant Examiner—Yean-Hsi Chang
(74) Attorney, Agent, or Firm—Haynes and Boone, LLP

(57) ABSTRACT

A portable computer housing including an enclosure with a support wall and a strike zone including a first protrusion in the support wall. A support member is attached to the enclosure. The support member includes a base wall positioned in close proximity to the support wall of the enclosure. A second protrusion is formed in the base wall of the support member. The second protrusion is offset from the base wall by a first distance with at least a portion of the second protrusion being received within the first protrusion. A recess in the second protrusion is offset from the base wall by a second distance. The second distance is less than the first distance. The potential for impact-related failure of components in the portable computer is greatly reduced. Also, the configuration of the strike zone reduces the magnitude of the shock from an impact and eliminates a portion of the high frequency content that is known to damage components such as the hard drive.

13 Claims, 3 Drawing Sheets

APPARATUS AND METHOD FOR REDUCING IMPACT-INDUCED SHOCK AND VIBRATION IN A PORTABLE COMPUTER

BACKGROUND

The disclosures herein relate generally to computer systems and more particularly to an apparatus and method for reducing impact-induced shock and vibration in a portable computer.

Electronic devices such as portable computers, personal digital assistants and portable telephones typically have relatively expensive impact-sensitive components that must be protected from harmful mechanical vibration and shock. In many types of portable electronic devices, impact to the enclosure of the device can result in harmful mechanical vibration and shock. The shock and vibration can adversely affect the performance of many components in a portable computer, including the hard drive, flat panel display and other shock-sensitive components. If the impact is great enough, one or more of the heads in the hard drive may experience an impact-induced head crash. An impact-induced head crash occurs when the actuator arm collides against the surface of an adjacent disk. A head crash may damage the head or the disk, resulting in reduced performance and reliability. The damage may result in immediate failure or undetected damage leading to a shortened operating life.

Although impact loadings occur when an electronic device is accidentally dropped, they are also possible when the electronic device is intentionally placed on a support surface. An impact loading sometimes referred to as a 'flat slap' impact often occurs in portable computers when the bottom surface of the enclosure engages a hard flat surface such as the surface of a table. This type of impact occurs even though most portable computers are generally equipped with resilient feet on their bottom surface for offsetting the bottom surface of the enclosure from the support surface. Warping of the bottom surface of the enclosure and the inertia of the heavy internal components of a portable computer contribute to flat slap impact that can damage internal components.

The hard drive of a portable computer is especially susceptible to damage from shocks associated with impact loadings. To reduce the potential for damage to the hard drives in portable computers, attempts have been made at providing damping devices that protect against loads being applied directly to the case of a hard drive. For example, U.S. Pat. Nos. 5,760,998 and 5,703,734 disclose hard drives that incorporate resilient members protruding from the exterior of the drive case to protect against impact loadings from flat drops of the hard drive. U.S. Pat. No. 5,535,092 discloses a hard drive that incorporates resilient members protruding from the corners of the drive case to protect against the case being dropped on a corner. Furthermore, other components in a hard drive may be mounted on resilient bushings to aid in reducing the transmission of shock and vibration to adjacent components of the hard drive and computer.

A feature commonly referred to as a strike zone has also been used to reduce the adverse effects of flat slap impacts in portable computers. The strike zone is a raised protrusion formed in a metal support member and sometimes in an adjacent portion of the plastic enclosure of the portable computer. The intent of the strike zone is to define an energy dissipating point of contact on the bottom of the portable computer. Typically, a peripheral device such as a hard drive is attached to the support member adjacent to the strike zone. The strike zone is intended to absorb and dissipate shock and vibration from an impact for reducing the peak amplitude of the resulting shock and vibration.

Although various attempts have been made to use strike zones to reduce the loadings applied to the internal components in a portable computer, only limited success has been achieved. Accordingly, there is a need for an improved strike zone configuration that provides greater reduction of impact related shock and vibration in a portable computer without any appreciable increase in manufacturing cost.

SUMMARY

One embodiment, accordingly, provides a portable computer including a strike zone having a recessed region for providing improved dissipation of shock and vibration associated with impact loadings. To this end, one embodiment provides an apparatus for dissipating impact energy in a computer system. The apparatus includes a support member including a base wall and a protrusion in the base wall of the support member. The protrusion is offset from the base wall by a first distance. A recess in the protrusion is offset from the base wall by a second distance. The second distance is less than the first distance.

A principal advantage of this embodiment is that the potential for impact related failures of components in a portable computer is greatly reduced.

BRIEF DESCRIPTION OF THE DRAWING FIGURES

DETAILED DESCRIPTION

Figure 1:
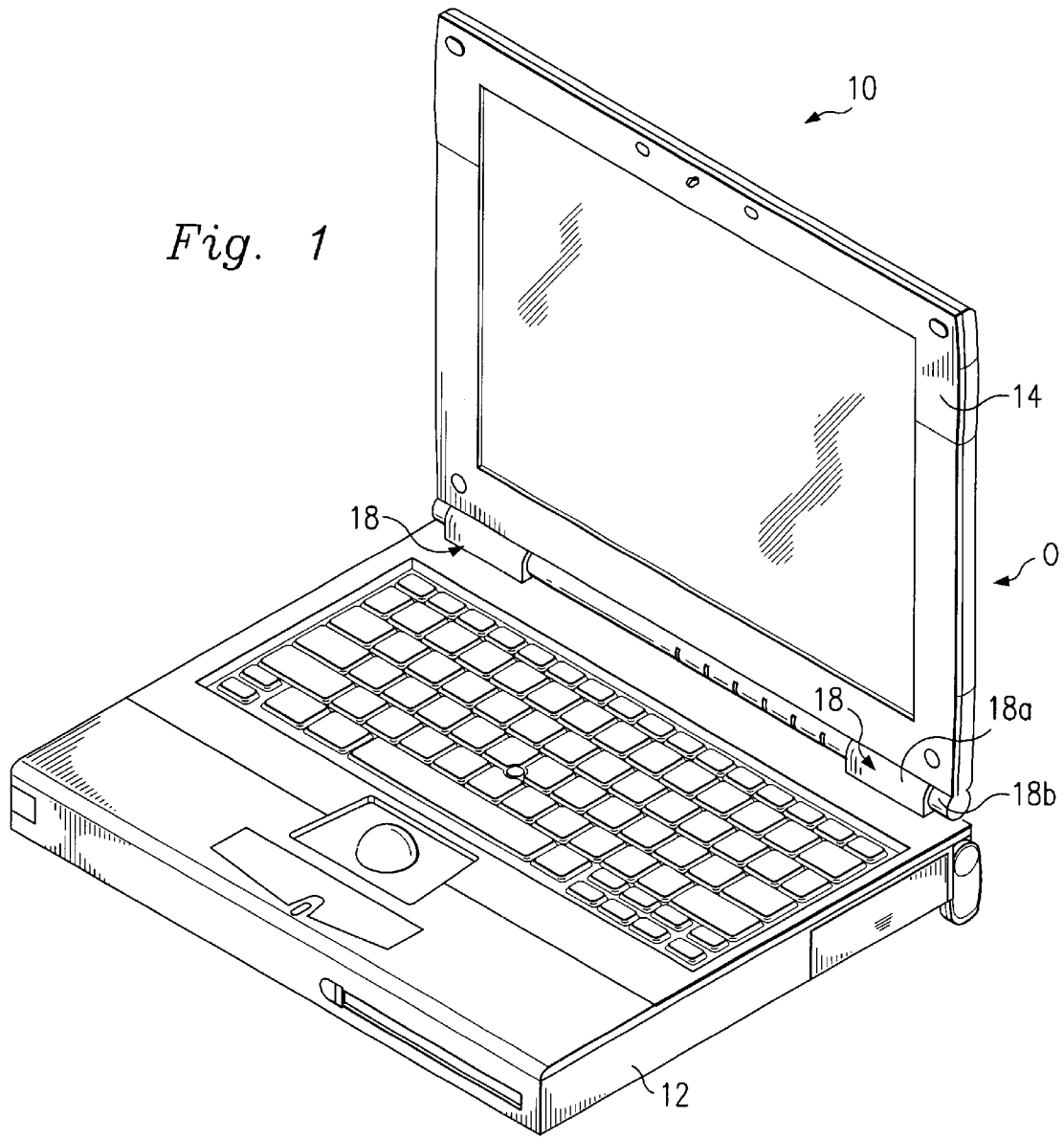
FIG. 1 is a perspective view illustrating an embodiment of a portable computer with a top enclosure in an open position with respect to a base enclosure.
Figure 2:
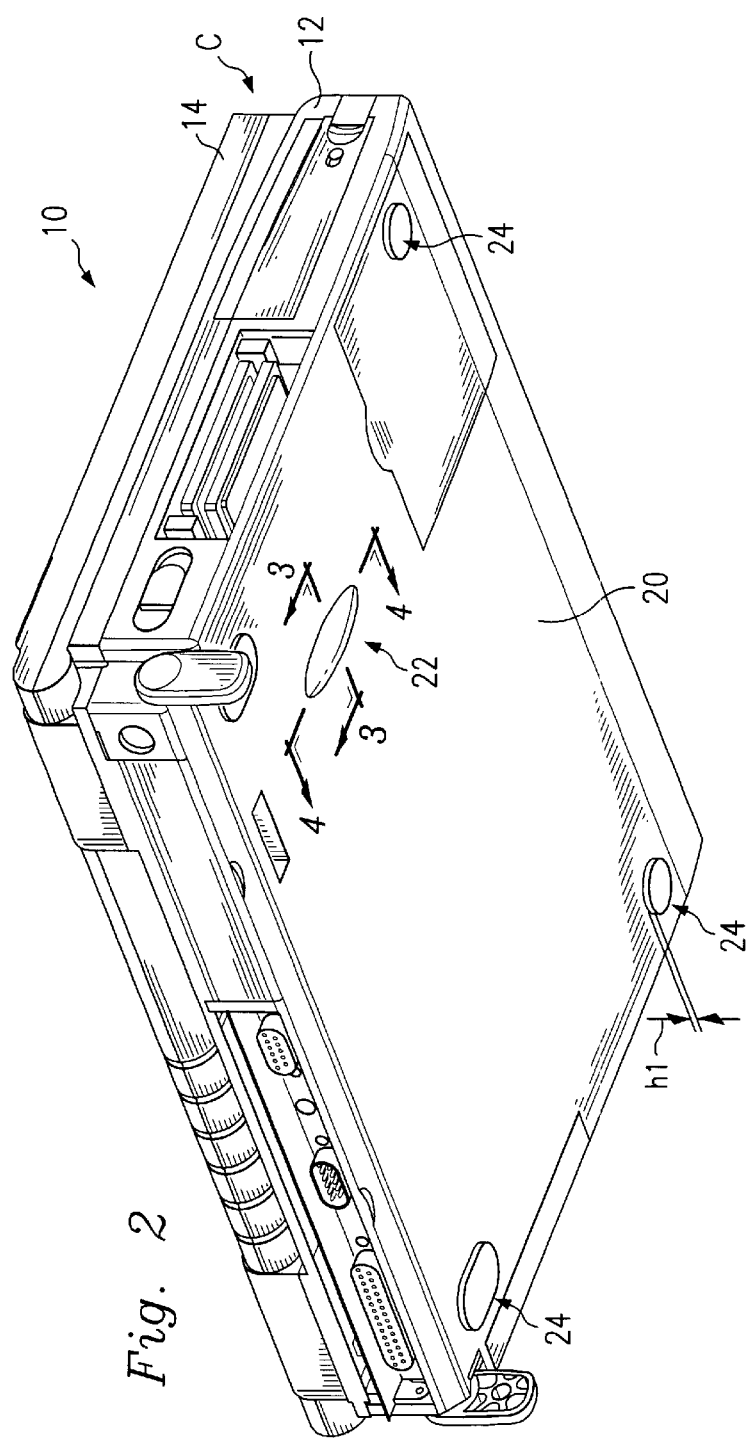
FIG. 2 is a perspective view of the portable computer with the top enclosure in a closed position with respect to the base enclosure.

An embodiment of a portable computer 10 is illustrated in FIGS. 1 and 2. The portable computer 10 includes a base enclosure 12 and a top enclosure 14. The base enclosure 12 and top enclosure 14 are injection molded from a polymeric material such as polycarbonate with 10% glass fiber. A preferred material is a product sold under the trademark Lexan by General Electric under the part number 500R.

The top enclosure 14 is attached to the base enclosure 12 by hinges 18. The hinges 18 include a first portion 18a attached to the base enclosure 12 and a second portion 18b attached to the top enclosure 14. The first portion 18a and second portion 18b are pivotally attached to permit the top enclosure 14 to be moved between an open position O, FIG. 1, and a closed position C, FIG. 2 with respect to the base enclosure 12.

The base enclosure 12 includes a support wall 20, FIG. 2. A plurality of resilient friction pads 24 are attached to the support wall 20 for limiting sliding of the computer 10 when placed on smooth surfaces and for providing a nominal amount of cushioning when placing the portable computer 10 on a hard surface. The resilient pads 24 are offset from the support wall 20 by a first distance h1 for offsetting the support wall 20 from an adjacent support surface such as the surface of a table.

Figure 3:
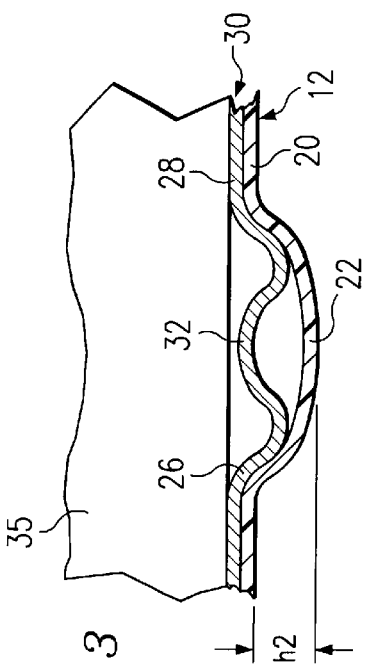
FIG. 3 is an enlarged a cross sectional view taken along line 3—3 in FIG. 2.
Figure 4:
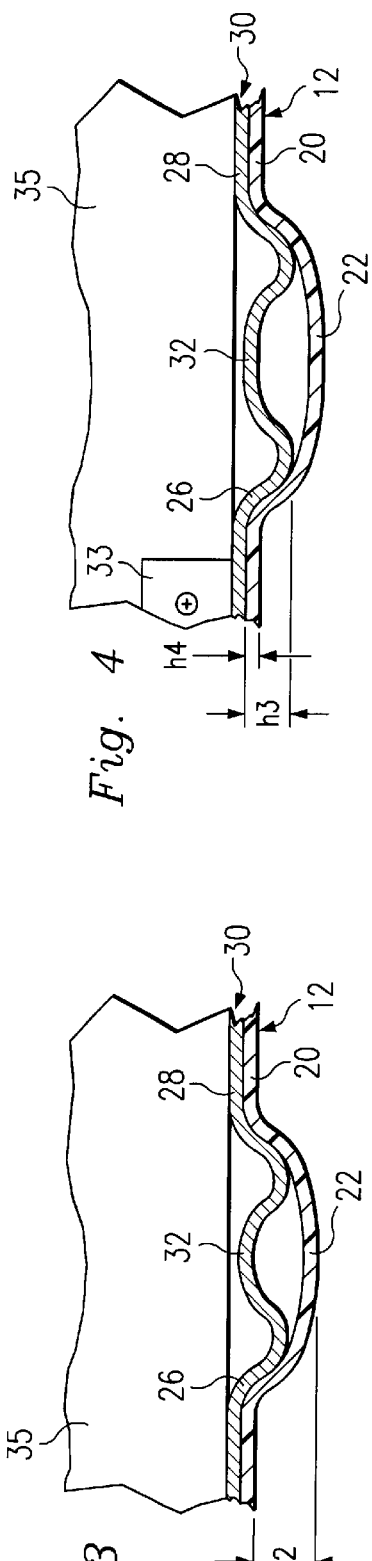
FIG. 4 is an enlarged cross sectional view taken along line 4—4 in FIG. 2.
Figure 5:
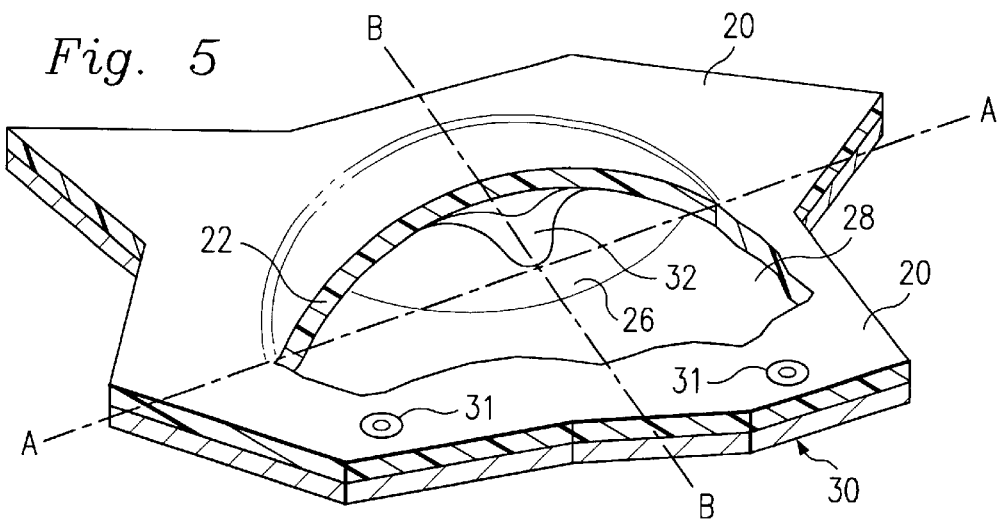
FIG. 5 is an enlarged fragmented perspective view illustrating an embodiment of a protrusion in a support bracket.

A first protrusion 22, FIG. 2, is formed in the support wall 20 of the base enclosure 12. The first protrusion 22 is offset from the support wall 20 by a second distance h2, FIG. 3, which is less than the first distance h1. An enlarged view of first protusion 22 is illustrated in FIGS. 3–5. A second protrusion 26, FIGS. 3–5, is formed in a base wall 28 of a support member 30 and covered by protrusion 22 in support wall 20. The support member 30 is typically made of a metallic material such as sheet metal using a process such as metal stamping and forming. A recess 32 is formed in the second protrusion 26. The second protrusion 26 is offset from the base wall 28 of the support member 30 by a third distance h3 and the recess 32 is offset from the base wall 28 by a fourth distance h4. The fourth distance h4 is less than the third distance h3.

In the embodiments illustrated herein, the first protrusion 22 and second protrusion 26 are shown to have an elongated profile, FIG. 3. The protrusion 22 and the protrusion 26 are elongated in a first direction A and the recess 32 is elongated in a second direction B generally perpendicular to the first direction A. In other embodiments (not shown), the protrusion 22 may be formed to have different profiles, e.g., a circular profile. A plurality of first and second protrusions 22, 26 may be provided as needed to attain the desired degree of energy dissipation at various locations of the base enclosure 12. In other embodiments (not shown), the base enclosure 12 may have an opening formed in the support wall 20 rather than having the first protrusion 22. In these embodiments, the second protrusion 26 may protrude through the opening.

The support member 30 is attached to the support wall 20 of the base enclosure 12 by fasteners 31 such as rivets or screws, FIG. 5. The base wall 28 is positioned in close proximity to the support wall 20. The support member 30 includes a flange 33, FIG. 4, for attachment to a system component such as a hard drive 35. A portion of the second protrusion 26 is positioned within and in close proximity to the first protrusion 22.

When the portable computer 10 is resting on a support surface such as the top of a table, the base wall 20 and first protrusion 22 are offset from the surface of the table due to the resilient feet 24. However, at the moment the portable computer 10 is place on the surface of the table, the base wall 28 has a tendency to deflect from inertial forces associated with the mass of the hard drive 35 and other system components mounted on the support member 30. The deflection of the base wall 28 results in deflection of the adjacent portion of the support wall 20.

Figure 6:
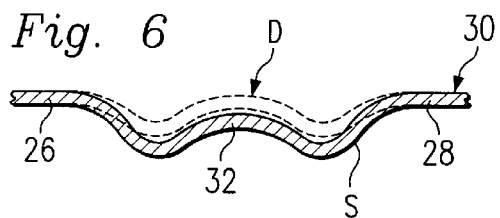
FIG. 6 is a cross sectional view illustrating the protrusion in the support bracket in a deflected position.

The first and second protrusions 22, 26 are configured to provide an energy dissipating contact region. With sufficient deflection of the base wall 28, the first protrusion 22 will contact the surface of the table and the second protrusion 26 will impact against the first protrusion 22. The contoured profile of the second protrusion 26 and the recess 32 permits the material that forms the second protrusion 26 and the recess 32 to flex between a static position S and a displaced position D when subjected to an impact, FIG. 6. The flexing damps the impact, limiting the shock and vibration transmitted to the hard drive 35 and other system components. A conventional protrusion without a recess exhibits very little deflection when subjected to an impact.

Figure 7:
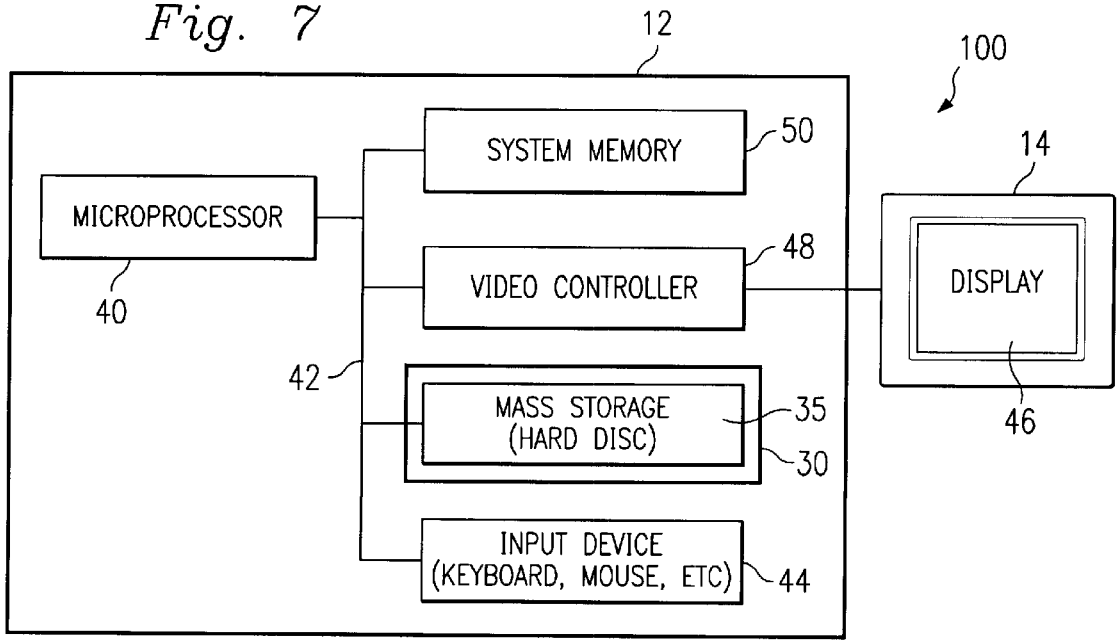
FIG. 7 is a block diagram illustrating an embodiment of a computer system.

The portable computer 10 includes a computer system 100, FIG. 7. The computer system 100 includes at least one microprocessor 40. The microprocessor 40 is connected to a bus 42. The bus 42 serves as a connection between the microprocessor 40 and other components of the computer system 100. One or more input devices 44 may be coupled to the microprocessor 40 to provide input to the microprocessor 40. Examples of input devices include keyboards, touchscreens, and pointing devices such as a mouse, a trackball and a trackpad. The computer system 100 may also include a display 46 which is coupled to the microprocessor 40 typically by a video controller 48. Programs and data are stored on a mass storage device such as the hard drive 35 which is coupled to the microprocessor 40. In addition to hard drives, mass storage devices include components such as optical disks, magneto-optical drives, floppy drives, and the like. A system memory 50 provides the microprocessor 40 with fast storage to facilitate execution of computer programs by the microprocessor 40. With respect to a portable computer, the various components of the computer system 100 with the exception of the display 46 are mounted in the base enclosure 12. The display 46 is mounted in the top enclosure 14 and the hard drive 35 is attached to the support member 30. It should be understood that other busses and intermediate circuits can be employed between the components described above and microprocessor 40 to facilitate interconnection between the components and the microprocessor 40.

One embodiment provides an apparatus for dissipating impact energy in a computer system. The apparatus includes a support member having a base wall and a protrusion in the base wall of the support member. The protrusion is offset from the base wall by a first distance. A recess in the protrusion is offset from the base wall by a second distance. The second distance is less than the first distance.

Another embodiment provides a portable computer housing including an enclosure with a support wall and a first protrusion in the support wall. A support member is attached to the enclosure. The support member includes a base wall positioned in close proximity to the support wall of the enclosure. A second protrusion is formed in the base wall of the support member. The second protrusion is offset from the base wall by a first distance with at least a portion of the second protrusion being received within the first protrusion. A recess in the second protrusion is offset from the base wall by a second distance. The second distance is less than the first distance.

A further embodiment provides a computer system including an enclosure having a support wall and a first protrusion in the support wall. A support member is attached to the enclosure. The support member includes a base wall positioned in close proximity to the support wall of the enclosure. A second protrusion is formed in the base wall of the support member. The second protrusion is offset from the base wall by a first distance with at least a portion of the second protrusion being received within the first protrusion. A recess formed in the second protrusion is offset from the base wall by a second distance. The second distance is less than the first distance. A microprocessor is mounted in the enclosure and an input is coupled to the microprocessor to provide input to the microprocessor. A mass storage is coupled to the microprocessor. The mass storage is attached to the support member. A display is coupled to the microprocessor by a video controller. Memory is coupled to the microprocessor to provide storage to facilitate execution of computer programs by the microprocessor.

As it can be seen, the embodiments presented herein provide several advantages. The potential for impact-related failure of components in a portable computer is greatly reduced. The cost associated with forming the improved strike zone is negligible. Existing protrusions in the plastic enclosure require no modifications. The configuration of the strike zone reduces the magnitude of the shock from an impact and eliminates a portion of the high frequency content that is known to damage components such as the hard drive.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An apparatus for dissipating impact energy in a computer system, comprising:

an enclosure including a wall;

a plurality of support pads extending from the wall by a first distance;

a shock absorbing first protrusion extending from the wall by a second distance, less than the first distance, the first protrusion having a curved surface; and a shock absorbing second protrusion extending toward the first protrusion, the second protrusion being covered by the first protrusion, the second protrusion having a recess formed therein defining a shock absorbing space between the first and second protrusions permitting the first protrusion to flex into the space.

2. The apparatus of claim 1 wherein the second protrusion is elongated in a first direction.

3. The apparatus of claim 2 wherein the recess is elongated in a second direction, the second direction being generally perpendicular to the first direction.

4. A portable computer housing, comprising:

an enclosure including a first wall;

a plurality of support pads extending from the first wall by a first distance;

a shock absorbing first protrusion extending from the first wall by a second distance, less than the first distance;

a support member attached to the enclosure, the support member including a second wall positioned in close proximity to the first wall of the enclosure;

a shock absorbing second protrusion in the second wall, the second protrusion extending toward the first protrusion and being covered by the first protrusion; and a recess in the second protrusion defining a shock absorbing space between the first and second protrusions permitting the first protrusion to flex into the space.

5. The housing of claim 4 wherein the first and second protrusions are elongated in a first direction.

6. The housing of claim 5 wherein the recess is elongated in a second direction, the second direction being generally perpendicular to the first direction.

7. The housing of claim 4 wherein the second protrusion is made of a metallic material and wherein the first protrusion is made of a polymeric material.

8. The housing of claim 4 wherein a portion of the second protrusion is in contact with the first protrusion.

9. A computer system, comprising:

an enclosure including a first wall and a shock absorbing first protrusion in the first wall;

a plurality of support pads extending from the first wall by a first distance, the first protrusion extending from the first wall by a second distance, less than the first distance;

a support member attached to the enclosure, the support member including a second wall positioned in close proximity to the first wall of the enclosure;

a shock absorbing second protrusion in the second wall, the second protrusion extending toward the first protrusion and being covered by the first protrusion;

a recess in the second protrusion defining a shock absorbing space between the first and second protrusions permitting the first protrusion to flex into the space;

a microprocessor mounted in the enclosure;

an input coupled to the microprocessor to provide input to the microprocessor;

a mass storage coupled to the microprocessor, the mass storage attached to the support member;

a display coupled to the microprocessor by a video controller; and memory coupled to the microprocessor to provide storage to facilitate execution of computer programs by the microprocessor.

10. The computer system of claim 9 wherein the first and second protrusions are elongated in a first direction.

11. The computer system of claim 10 wherein the recess is elongated in a second direction, the second direction being generally perpendicular to the first direction.

12. The computer system of claim 9 wherein the second protrusion is made of a metallic material and wherein the first protrusion is made of a polymeric material.

13. The computer system of claim 9 wherein a portion of the second protrusion is in contact with the first protrusion.

* * * * *